United States Patent
Schulte et al.

(10) Patent No.: US 8,735,790 B2
(45) Date of Patent: May 27, 2014

(54) METHOD FOR EXAMINING AN OBJECT USING A MICROSCOPE WITH DELAYED CONTROL SIGNALS AND A MICROSCOPE FOR EXAMINING AN OBJECT

(75) Inventors: Ludger Schulte, Schriesheim (DE); Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 537 days.

(21) Appl. No.: 12/954,629

(22) Filed: Nov. 25, 2010

(65) Prior Publication Data

US 2011/0149290 A1   Jun. 23, 2011

(30) Foreign Application Priority Data

Nov. 26, 2009 (DE) .......................... 10 2009 055 993

(51) Int. Cl.
*G02B 7/04* (2006.01)
*G02B 27/40* (2006.01)
*G02B 27/64* (2006.01)

(52) U.S. Cl.
USPC ......... 250/201.3; 250/206; 359/363; 359/900

(58) Field of Classification Search
USPC ......... 250/201.3, 206, 214.1, 214 R, 214 DC; 359/900, 268–372, 385–390, 393–395
See application file for complete search history.

(56) References Cited

U.S. PATENT DOCUMENTS

| 4,530,107 | A | 7/1985 | Williams |
| 5,252,834 | A | 10/1993 | Lin |
| 5,982,535 | A | 11/1999 | Inoue |
| 6,426,490 | B1 | 7/2002 | Storz |
| 2001/0015411 | A1 | 8/2001 | Ohdaira et al. |
| 2002/0149396 | A1* | 10/2002 | Mizuhara et al. ................. 327/1 |
| 2002/0153470 | A1* | 10/2002 | Kumagai et al. ........... 250/206.2 |
| 2003/0155482 | A1* | 8/2003 | Moellmann ................ 250/201.3 |
| 2009/0250627 | A1 | 10/2009 | Wolleschensky |

FOREIGN PATENT DOCUMENTS

| DE | 101 43 855 A1 | 4/2003 |
| GB | 2413719 A | 11/2005 |

* cited by examiner

*Primary Examiner* — Francis M Legasse, Jr.
(74) *Attorney, Agent, or Firm* — Leydig, Voit & Mayer, Ltd.

(57) ABSTRACT

A microscope for examining an object includes a laser light source generating pulsed light so as to illuminate the object. A measuring system including a detector is adapted to detect detection light coming from the object and the measuring system generates a measurement signal based on the detection light. The microscope includes a programmable integrated circuit including a control element and at least one of a first delay element and a second delay element. The control element is configured to generate a first control signal adapted to control the detector and the measuring system. The control element is further configured to generate a second control signal adapted to control the laser light source. The first and second delay elements are configured to delay the first and second control signals, respectively.

14 Claims, 2 Drawing Sheets

METHOD FOR EXAMINING AN OBJECT USING A MICROSCOPE WITH DELAYED CONTROL SIGNALS AND A MICROSCOPE FOR EXAMINING AN OBJECT

CROSS-REFERENCE TO PRIOR APPLICATIONS

Priority is claimed to German Patent Application No. 10 2009 055 993.0, filed Nov. 26, 2009, the entire disclosure of which is incorporated herein by reference.

FIELD

The invention relates to a microscope for examining an object, said device comprising a laser light source and a detector and measuring system. Further, the invention relates to a method for examining an object with the aid of a microscope.

BACKGROUND

In microscopy methods that use pulsed laser light for illuminating the sample it is important that the excitation pulses and the responses of the measured object to the excitation pulses fall within a temporal detection interval that is favorable for the measuring system used. Due to the technical design of the excitation light sources, the detection systems for detecting the light coming from the sample, the measuring system for determining the time periods between the excitation of the sample and the response, and the corresponding system tolerances of the individual components, it is necessary to take the respective delay of the individual components into account. For this purpose, control signals for generating the light pulses and control signals for synchronizing the detector and measuring equipment are timed to one another such that an optimal result of measurement can be achieved. This is, for example, achieved in that the control signals are delayed by a suitable amount of time.

It is known to achieve such a delay by using signal lines of different lengths. Dependent on the material of the line, the signal propagation speed in the line and the length of the line, a delay, for example, in the nanosecond range or in the subnanosecond range can then be achieved very precisely. The lengths of the individual signal lines are precisely calculated, and the corresponding lines are firmly installed in the microscope. Further, it is known to use specific electronic delay elements for delaying the control signals, which delay elements make regular delays up to the picosecond range possible.

SUMMARY

In an embodiment the present invention provides a microscope for examining an object which includes a laser light source generating pulsed light so as to illuminate the object. A measuring system including a detector is adapted to detect detection light coming from the object and the measuring system generates a measurement signal based on the detection light. The microscope includes a programmable integrated circuit including a control element and at least one of a first delay element and a second delay element. The control element is configured to generate a first control signal adapted to control the detector and the measuring system. The control element is further configured to generate a second control signal adapted to control the laser light source. The first and second delay elements are configured to delay the first and second control signals, respectively.

BRIEF DESCRIPTION OF THE DRAWINGS

Embodiments of the invention are explained in more detail below with reference to schematic drawings in which like elements are designated with the same references. However, the present invention is not limited to illustrated embodiments. Other features and advantages of various embodiments will become apparent by reading the following detailed description with reference to the attached drawings which illustrate the following.

DETAILED DESCRIPTION

Figure 1:
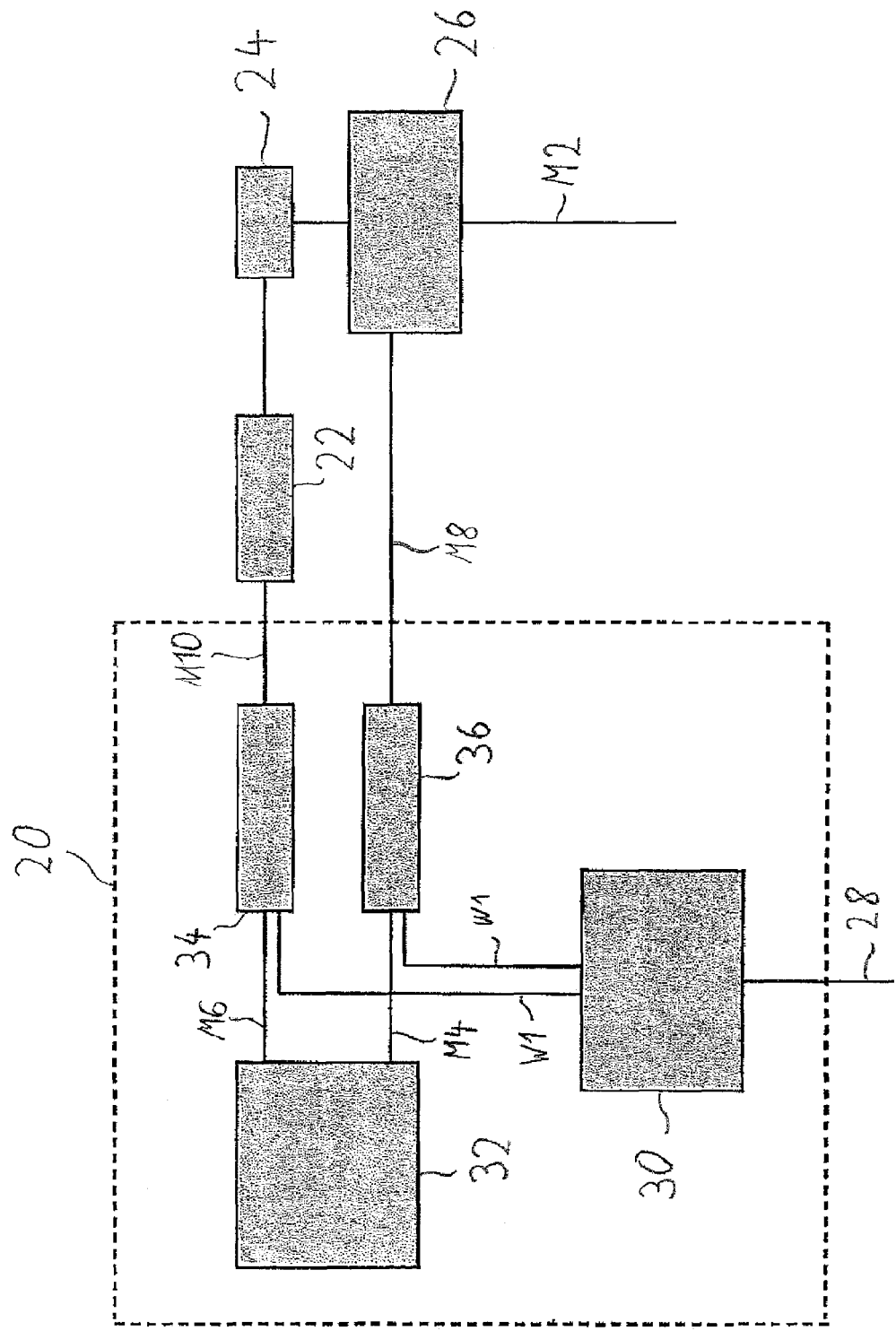
FIG. 1 shows a block diagram of a microscope.

In an embodiment, the present invention provides a microscope comprising a laser light source, a detector and measuring system. The laser light source generates pulsed laser light for illuminating the object. The detector and measuring system detects detection light coming from the object and generates a measurement signal dependent on the detected detection light. In another embodiment, the present invention provides a method for examining an object with the aid of a microscope, in which method pulsed laser light is generated for illuminating the object. Detection light coming from the object is detected and a measurement signal is generated dependent on the detected detection light. In particular, the invention relates to a confocal microscope, a scanning microscope or a confocal scanning microscope.

An aspect of the present invention is to specify a microscope for examining an object and a method for examining an object with the aid of a microscope which, at a low technical expense, enables precise control of a laser light source for illuminating the object and/or of a detector and measuring system for detecting the detection light coming from the object.

In an embodiment, the present invention provides a programmable integrated circuit including a control element, a first delay element and/or a second delay element. The control element generates a first control signal for controlling the detector and measuring system and a second control signal for controlling the laser light source. The first delay element delays the first control signal. The second delay element delays the second control signal. Thus, as the case may be, the delayed first signal serves to control the detector and measuring system and the delayed second control signal serves to control the laser light source, respectively.

The use of the programmable integrated circuit as a delay element allows to precisely set the delay caused by the delay elements simply by a corresponding programming of the programmable integrated circuit and to vary the delay dependent on the programming. This helps to precisely set the microscope and/or to make a later modification of components of the microscope possible. In other words, system changes can easily be responded to in this way. In addition, in the case of an already existing programmable integrated circuit an additional component such as a delay element can be dispensed with. Further, for cabling arbitrary lines, for example, standardized line lengths can be used. The setting of the delay times then takes place on the software-side, for example via a given software interface.

In an advantageous embodiment, at least one of the delay elements comprises a first delay unit and a second delay unit.

This can easily help to achieve a long delay, for example, via the first delay unit, which delay can be very precisely set via the second delay unit. In this connection it is particularly advantageous when the first delay unit comprises a first clocked digital delay element, for example, a first shift register, to the input of which the corresponding control signal, i.e. the first or the second control signal, and a first clock signal are applied. Dependent on a logic length of the first shift register, the corresponding control signal is then delayed. By means of the two delay units, delays from less than one nanosecond to several seconds are possible.

An additional delay is achieved by the second delay unit which comprises a pulse shaper which halves a pulse duration of the delayed control signal. The first output signal of the pulse shaper is applied to a first input of a clocked digital delay element, for example a second shift register. The output signal of the pulse shaper is then delayed dependent on a logic length of the second shift register. This enables a delay of the control signal with a temporal resolution that is twice as high as the period duration of a basic clock rate, in particular of a first clock signal of the programmable integrated circuit.

In this connection, it is advantageous when the delayed control signal, halved with respect to the pulse duration, is applied to a second output of the pulse shaper as a second output signal. The second output signal of the pulse shaper is applied to an input of a third clocked digital delay element, for example a third shift register. The third shift register delays the second output signal of the pulse shaper dependent on a logic length of the third shift register. In addition, a switching element is provided to the first input of which the control signal delayed by the second shift register is applied and to the second input of which the control signal delayed by the third shift register is applied. The control signal delayed by the second shift register or the control signal delayed by the third shift register can now be alternately applied to an output of the switching element. As a result thereof, a delayed control signal can be generated which can be delayed in an order which corresponds to the order of the delay of the smallest unit of the logic length of the used shift registers. Thus, delays, such as delays which correspond to a light guide having a length of 5 cm, can be particularly precisely preset.

Preferably, the lengths of the shift registers and thus the delays are variable and can, for example, be preset via an interface of the programmable integrated circuit.

With respect to one embodiment of the method, the first and/or second control signal is delayed in a first delay step and in a second delay step. In doing so, the control signal is delayed, for example with the first shift register, in the first delay step. In the second delay step, at first the pulse duration of the delayed control signal is halved and then the control signal which is halved with respect to the pulse duration is delayed dependent on a second delay value. Preferably, the control signal halved with respect to the pulse duration is delayed, parallel to the delay dependent on the second delay value, dependent on a third delay value, for example, with the aid of the third shift register. The control signal delayed dependent on the second and third delay value, respectively, is then applied to the two inputs of the switching element and is alternately switched through to the output of the switching element.

FIG. 1 shows a block diagram of a microscope and a signal course between the individual elements of the block diagram. The microscope is preferably a confocal microscope, a scanning microscope or a confocal scanning microscope. The microscope comprises a control system which is formed by a programmable integrated circuit 20 (FPGA). The programmable integrated circuit 20 is coupled to a laser light source 22. The laser light source 22 generates pulsed laser light which is reflected by a non-illustrated object, in particular a sample, or which causes fluorescence effects in the sample, the reflections or the fluorescence emissions being detected by a detector 24. The detector 24 is coupled to a measuring system 26. In other words, the detector 24 and the measuring system 26 form a detector and measuring system 24, 26.

The programmable integrated circuit 20 comprises an interface 28 which is coupled to a delay arithmetic unit 30. A control element 32 is coupled via a first output of the control element 32 to a first delay element 36 and via a second output of the control element 32 to a second delay element 34. On the output side, the delay arithmetic unit 30 is coupled to the first and second delay element 36, 34. The components of the programmable integrated circuit 20 are provided in the form of defined program steps on the programmable integrated circuit 20.

The detector and measuring system 24, 26 generates a measurement signal M2 dependent on the radiation emitted by the sample. The control element 32 generates a first control signal M4 which is delayed with the aid of the first delay element 36. A first control signal M8 delayed by the first delay element 36 controls the detector and measuring system 24, 26. The control element 32 additionally generates a second control signal M6 which is delayed with the aid of the second delay element 34. The second control signal M10 delayed by the second delay element 34 controls the light source 22.

Via the interface 28, a total delay value W1 or individual delay values can be transferred to the programmable integrated circuit 20. The total value of the delay is then converted into individual delay values for the two delay elements 34, 36 by the arithmetic unit 30.

Figure 2:
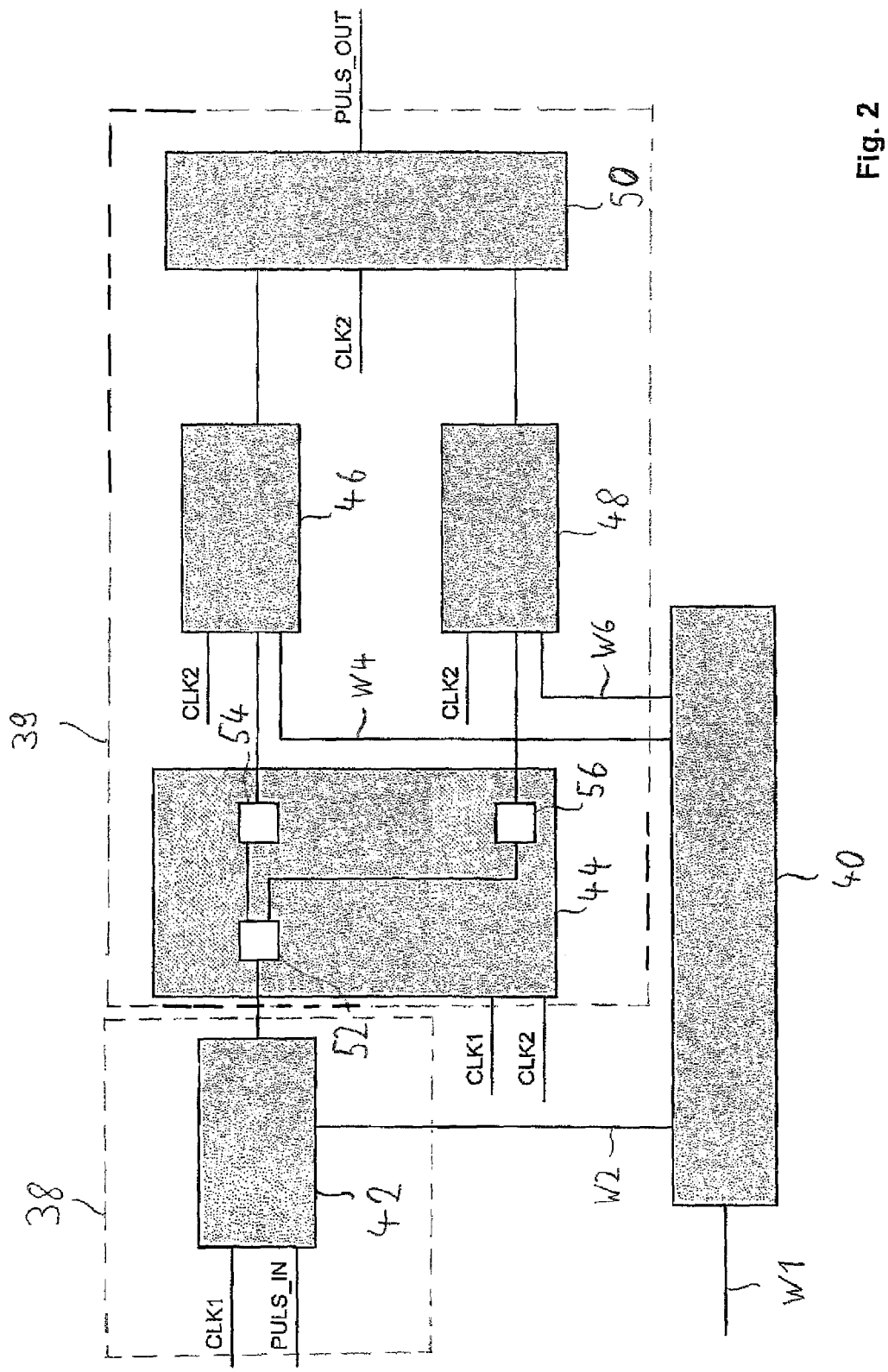
FIG. 2 shows a block diagram of a delay element of the microscope.

FIG. 2 shows a block diagram and a signal course of the first delay element 36. The first delay element 36 comprises a first delay unit 38 and a second delay unit 39. In the first delay unit 38 a first delay step is executed. The first delay unit 38 comprises a first shift register 42, to the first input of which a first clock signal CLK1 is applied, to the second input of which the first control signal M4 is applied as an input signal PULS_IN and to the third input of which a signal of an internal arithmetic unit 40 is applied via which a first delay value W2 is predetermined.

Dependent on the first delay value W2, the logic length of the first shift register 42 is set. The logic length of the shift register 42 corresponds to a delay time that is achieved by the first shift register 42. Thus, the delay achieved with the aid of the first shift register 42 is dependent on the first delay value W2. An output of the first shift register 42 is coupled to a pulse shaper 44. The first shift register 42 is used for a coarse delay of the applied control signal, for example in an order of several seconds. A temporal resolution of the delay in the first delay step is equal to the period duration of the first clock signal CLK1.

The pulse shaper 44 forms part of the second delay unit 39 in which a second delay step is executed, and comprises a pulse shaper control unit 52 and a first parallel-to-serial converter 54 and a second parallel-to-serial converter 56. The control signal delayed dependent on the first delay value W2 is sent to the two parallel-to-serial converters 54, 56 via the pulse shaper control unit 52. An output of the first parallel-to-serial converter 54 corresponds to a first output of the pulse shaper 44 and is coupled to a first input of a second shift register 46. A second clock signal CLK2 is applied to a second input of the second shift register 46. The frequency of the second clock signal CLK2 corresponds to an integer multiple of the frequency of the first clock signal CLK1. A third input of the second shift register 46 is coupled to the arithmetic unit

40. An output of the second shift register 46 is coupled to a first input of a switching element 50.

An output of the second parallel-to-serial converter 56 corresponds to a second output of the pulse shaper 44 and is coupled to a first input of a third shift register 48. The second clock signal CLK2 is applied to a second input of the third shift register 48. A third input of the third shift register 48 is coupled to the internal arithmetic unit 40. An output of the third shift register 48 is coupled to a second input of the switching element 50. The second clock signal CLK2 is applied to a third input of the switching element 50. An output signal PULS_OUT of the first delay element 36 is applied to an output of the switching element 50. Dependent on the output signal PULS_OUT of the switching element 50, which corresponds to the delayed control signal M8, then the measuring system 26 is controlled. The switching element 50 is preferably a double-data-rate flip flop (DDR-FF). The second delay step is executed with the aid of the pulse shaper 44, the second and the third shift register 46, 48. A temporal resolution of the delay in the second delay step is equal to the period duration of the second clock signal CLK2.

An internal structure of the second delay element 34 corresponds to the internal structure of the first delay element 36, in the second delay element 34 the second control signal M6 being applied as an input signal PULS_IN and the output signal PULS_OUT of the second delay element 34 corresponding to the delayed second control signal M10.

The input signal PULS_IN is a number of pulses, the length of which corresponds to the period duration of the first clock signal CLK1. A logic length of the first shift register 42 and thus a delay caused by the first shift register 42 is dependent on the first delay value W2. An output signal of the first shift register 42, which signal is dependent on the logic length of the first shift register 42, on the first clock signal CLK1 and on the input signal PULS_IN is applied to the input of the pulse shaper 44 and thus to the input of the pulse shaper control unit 52. The pulse shaper control unit 52 applies the signal to the first parallel-to-serial converter 54 and, parallel thereto, to the second parallel-to-serial converter 56. The parallel-to-serial converters 54, 56 halve the applied signal in that each logic one is halved and the one half remains unchanged and the other half is converted into logic zeros. Given a rising flank of the first clock signal CLK1, for example, the two parallel-to-serial converters 54, 56 are loaded with data, for example with four successive ones and with four successive zeros. As a result thereof, the clock rate of the two signals is halved.

The signals delayed by the first shift register 42 and halved by the pulse shaper 44 are then forwarded to the second and the third shift register 46, 48, respectively. The logic length of the second shift register 46 is set dependent on a second delay value W4 and the logic length of the third shift register 48 is set dependent on a third delay value W6. In other words, the second and the third delay values W4, W6 predetermine the delays which are achieved by the second shift register 46 and the third shift register 48, respectively. The control signals delayed dependent on the second delay value W4 and on the third delay value W6, respectively, are then applied to the first and the second input of the switching element 50. Further, the second clock signal CLK2 is applied to the third input of the switching element 50. Given a rising flank of the second clock signal CLK2, now the input signal of the first input of the switching element 50 is switched to the output of the switching element 50, and given a falling flank of the second clock signal CLK2, the second input of the switching element 50 is switched to the output of the switching element 50. Thus, a total delay of the first delay element 36 can be precisely set to the difference of the logic lengths of the second and third shift registers 46, 48 and can be switched with half a period of the second clock signal CLK2. This enables delays from a few picoseconds to several seconds. Basically, with increasing clock frequency, decreasing delays can be achieved. When the delays of the second and third shift register 46, 48 are equal, then the second delay unit 39 delays the respective control signal by an integer multiple of the period durations of the second clock signal CLK2. When the delays of the second and third shift register 46, 48 are different from one another, then with the second delay unit 39 a delay with an accuracy of half a period duration of the second clock signal CLK2 can be achieved. For example, a frequency of the first clock signal CLK1 can correspond to 40 MHz. A frequency of the second clock signal CLK2 can, for example, correspond to 320 MHz.

The invention is not restricted to the embodiments described. For example, only the first control signal M4 or the second control signal M6 can be delayed by the corresponding delay element 36, 34. The respective other control signal may then either be not delayed at all or be delayed with the aid of a light guide. Further, the second delay unit 39 can merely comprise the pulse shaper 44 and/or the second shift register 46. Alternatively, for a fine delay exclusively the second delay unit 39 can be provided and a coarse delay can then be achieved with the aid of a light guide, if necessary. Further, the individual delay values can be fixedly determined and thus define the lengths of the shift registers. The individual delay values can be equal or different from one another. As an alternative to one or several of the shift registers, also arbitrary other clocked digital delay elements can be used which, for example, are based on memory chips of the integrated circuit. Then, a maximum possible delay period of the respective clocked digital delay element then corresponds to the logic length of the corresponding shift register.

While the invention has been particularly shown and described with reference to preferred embodiments thereof, it will be understood by those skilled in the art that various changes in form and details may be made without departing from the spirit and scope of the invention.

LIST OF REFERENCE SIGNS

20 circuit
22 laser light source
24 detector
26 measuring system
30 delay arithmetic unit
32 control element
34 second delay element
36 first delay element
38 first delay unit
39 second delay unit
40 internal arithmetic unit
42 first shift register
44 pulse shaper
46 second shift register
48 third shift register
50 switching element
52 pulse shaper control unit
54 first parallel-to-serial converter
56 second parallel-to-serial converter
M2 measurement signal
M4 first control signal
M6 second control signal
M8 delayed first control signal
M10 delayed second control signal
CLK1 first clock signal
PULS_IN input signal W2 first delay value
CLK2 second clock signal
PULS_OUT output signal
W1 total delay value

What is claimed is:

1. A scanning microscope for examining an object, comprising:
   a laser light source generating pulsed light so as to illuminate the object;
   a measuring system including a detector adapted to detect detection light coming from the object, the measuring system generating a measurement signal based on the detection light;
   a programmable integrated circuit including:
      a control element configured to generate a first control signal adapted to control the detector and the measuring system, the control element being further configured to generate a second control signal so as to control the laser light source; and
      a first delay element and a second delay element, the first and second delay elements being configured to delay the first and second control signals respectively.

2. The microscope according to claim 1, wherein at least one of the first and second delay elements includes a first delay unit and a second delay unit.

3. The microscope according to claim 2, wherein the first delay unit includes a first clocked digital delay element and the second delay unit includes at least one of a second clocked digital delay element and a third clocked digital delay element.

4. The microscope according to claim 3, wherein the first clocked digital delay element includes a first shift register having an input configured to receive a corresponding control signal and a first clock signal, the first clocked digital delay element adapted to delay the corresponding control signal based on a logic length of the first shift register so as to produce a delayed control signal.

5. The microscope according to claim 4, wherein the second delay unit includes a pulse shaper which halves a pulse duration of the delayed control signal, the pulse shaper including:
   a first input adapted to receive the delayed control signal;
   a second input adapted to receive the first clock signal;
   a third input adapted to receive a second clock signal having a frequency that corresponds to an integer multiple of a frequency of the first clock signal; and
   a first output adapted to transmit the delayed control signal with the halved pulse duration so as to control at least one of the laser light source and the measuring system.

6. The microscope according to claim 5, wherein the second clocked digital delay element includes a second shift register having a first input adapted to receive a first output signal from the pulse shaper and a second input adapted to receive the second clock signal, wherein the first output signal is delayed based on a logic length of the second shift register so as to produce a second delayed control signal, and wherein the second shift register further includes an output adapted to transmit the second delayed control signal so as to control at least one of the laser light source and the measuring system.

7. The microscope according to claim 6, wherein a second output of the pulse shaper is adapted to transmit the delayed control signal with halved pulse duration as a second output signal, the third clocked digital delay element including a third shift register having a first input adapted to receive the second output signal and a second input receiving the second clock signal, the third clocked digital delay element being adapted to delay the second output signal based on a logic length of the third shift register so as to produce a third delayed control signal, the third shift register further including an output adapted to transmit the third delayed control signal, and wherein the microscope further comprises a switching element having a first input adapted to receive the second delayed control signal from the second shift register, a second input adapted to receive the third delayed control signal from the third shift register and a third input adapted to receive the second clock signal, the switching element, given a rising flank of the second clock signal, being adapted to provide the second delayed control signal to an output of the switching element and, given a falling flank of the second clock signal, being adapted to provide the third delayed control signal to the output of the switching element, the output of the switching element adapted to control at least one of the laser light source and the measuring system.

8. The microscope according to claim 7, wherein the logic length of at least one of the first, second and third shift register is variable.

9. The microscope according to claim 8, wherein a respective one of the delay elements includes an arithmetic unit coupled to at least one of the first, second and third shift registers and adapted to predetermine the logic length of the at least one of the first, second and third shift registers respectively based on at least one of a predetermined first, second and third delay value.

10. The microscope according to claim 9, wherein the first, second and third delay values are respectively predeterminable via an interface of the programmable integrated circuit.

11. A method for examining an object with the aid of a microscope, the method comprising:
   providing a scanning microscope;
   illuminating the object with pulsed laser light from a laser light source of the scanning microscope;
   detecting detection light coming from the object with a detector of the scanning microscope;
   generating a measurement signal dependent on the detected detection light;
   generating first and second control signals; and
   delaying the first control signal using a first delay element in a first delay step, wherein the measurement signal is generated dependent on the delayed first control signal, and delaying the second control signal using the second delay element in a second delay step, wherein the laser light source is controlled dependent on the delayed second control signal.

12. The method according to claim 11, wherein a pulse duration of the corresponding control signal is halved in the second delay step and further comprising delaying the corresponding control signal, halved with respect to the pulse duration, again.

13. The method according to claim 12, wherein the corresponding control signal is delayed dependent on a predetermined first delay value and dependent on a first clock signal in the first delay step,
   wherein the corresponding control signal, delayed dependent on the predetermined first delay value, is halved with respect to its pulse duration and is delayed dependent on a predetermined second delay value and dependent on a second clock signal in the second delay step, the frequency of the second clock signal corresponding to an integer multiple of a frequency of the first clock signal and the delay of the corresponding control signal being further dependent on a predetermined third delay value and dependent on the second clock signal, and wherein, given a rising flank of the second clock signal, the corresponding control signal delayed dependent on the second delay value is applied to an output of a switching element, and, given a falling flank of the second clock signal, the corresponding control signal delayed dependent on the third delay value is applied to the output of the switching element, the method further comprising controlling a detector and a measuring system with the aid of an output signal of the switching element and a laser light source.

14. The method according to claim 13, wherein at least one of the delay values is predetermined via an interface of a programmable integrated circuit.

* * * * *